UNITED STATES PATENT OFFICE.

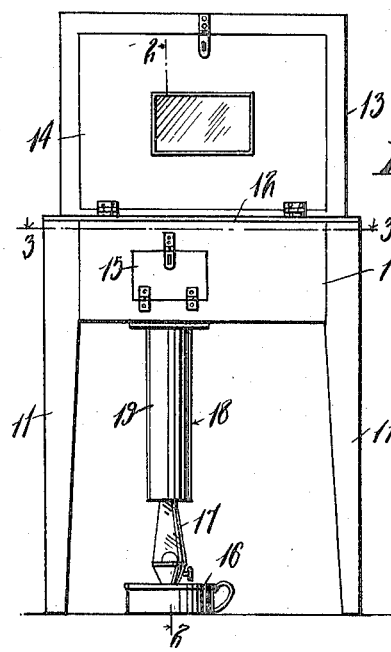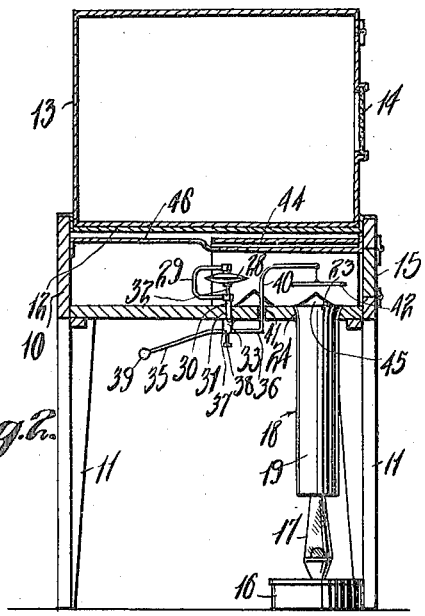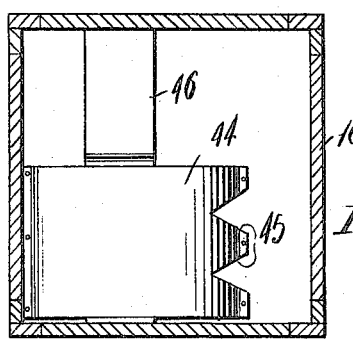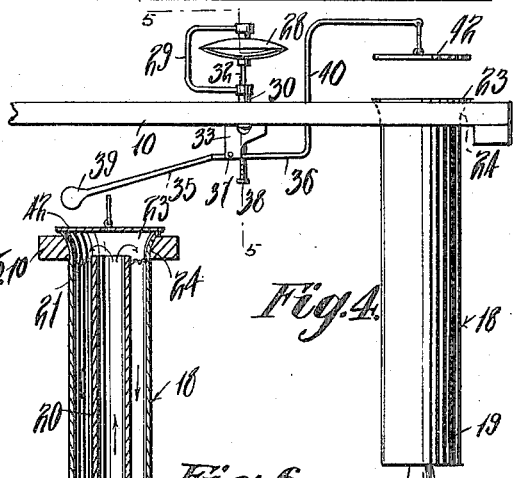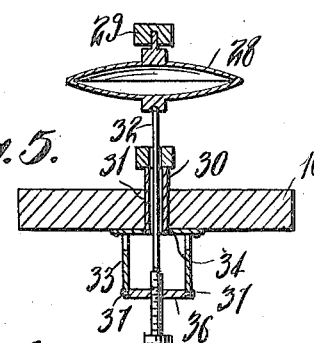

ELMER C. MEYER, OF BOONVILLE, MISSOURI.

DOUGH-RAISER.

1,164,299.  Specification of Letters Patent.  Patented Dec. 14, 1915.

Application filed September 18, 1913. Serial No. 790,537.

*To all whom it may concern:*

Be it known that I, ELMER C. MEYER, a citizen of the United States, residing at Boonville, in the county of Cooper, State of Missouri, have invented certain new and useful Improvements in Dough-Raisers; and I do hereby declare the following to be a full, clear, and exact description of the invention, such as will enable others skilled in the art to which it appertains to make and use the same.

This invention relates to dough raisers and has for an object to provide a device of this character employing novel regulating means for controlling the heat.

A further object of the invention is to provide a novel flue whereby when the damper is closed the heat is returned down the flue outside of the heater chimney.

A still further object is to provide a novel baffle in the heating chamber for deflecting the heat laterally.

With the above objects in view the invention consists of certain novel details of construction and combination of parts hereinafter fully described and claimed, it being understood that various modifications may be made in the minor details of construction within the scope of the appended claim.

In the accompanying drawing illustrating this invention:—Figure 1 is a front elevation of the dough raiser. Fig. 2 is a longitudinal sectional view on the line 2—2 Fig. 1. Fig. 3 is a cross sectional view on the line 3—3 Fig. 1. Fig. 4 is an enlarged side elevation showing the heat controlling device. Fig. 5 is a cross sectional view on the line 5—5 Fig. 4. Fig. 6 is a fragmentary longitudinal sectional view through the flue with the damper closed showing the return of the heat outside of the heater chimney.

Referring now to the drawing in which like characters of reference designate similar parts, the device is shown to comprise a substantially square open top shallow casing 10 that is supported at the corners upon legs 11 and is closed by a depressed cover 12 within the depression of which the heating chamber 13 rests, the latter being preferably formed of tin, and being designed to contain the bowl of dough to be raised, or tins in which the dough may be raised, as desired. Both the heating chamber and the casing are provided with respective doors 14 and 15 through which the interiors may be used.

In connection with the invention, an ordinary lamp 16 may be used as a heater, the lamp being equipped with an ordinary chimney 17, and preferably the lamp is placed upon the floor underneath the casing and between the legs thereof, although it may be placed upon any desired support, in this location.

In carrying out my invention, I provide a flue 18 having an outer wall 19, and an inner wall 20, the walls being connected at the top by a perforated closure 21 and at the bottom by a perforated closure 22, there being a funnel-shaped mouth 23 attached to the outer wall and projecting through an opening 24 formed in the bottom of the casing. The lamp chimney is centered at the bottom of the flue so that the heat passes upwardly through the inclosure of the inner wall 20 of the flue and escapes through the mouth 23 into the casing. A damper which will be presently described is disposed within the casing above the mouth and when closed tight down on the mouth, the heat will be turned thereby and passed downwardly between the inner wall and outer wall of the flue, finally escaping through the perforated closure 22 at the bottom of the flue, outside of the lamp chimney whereby the operation of the lamp is not obstructed.

For regulating the heat, I provide a thermostat disk 28 that is supported within the casing by means of a U-shaped bracket 29, the latter being attached by means of a tube 30 that enters an opening 31 in the bottom, there being a pin 32 projecting through this tube and bearing upon the thermostat, this pin extending below the bottom. A bracket 33 of inverted U-shaped form is secured to the bottom, there being an opening 34 in this bracket that receives the pin 32. A lever 35 is provided with a flattened end 36 that is pivoted as shown at 37 to the legs of the bracket 33, there being a set screw 38 threaded through this flattened end and supporting the pin 32. A weight 39 is fixed to the outer end of the lever. Fixed to the flattened end of the lever is an upright bracket arm 40 that projects through an opening 41 in the bottom of the casing and is terminally equipped with a damper 42 arranged above the flue mouth 23.

In operation the dough to be raised is placed in the heating chamber 13 in a bowl or in tins as desired, and the lamp lighted. The set screw 38 is then adjusted so that the thermostat will maintain the damper in the proper position relatively to the flue to maintain the desired temperature in the heating chamber. Upon a fall in temperature, with a resultant contraction of the thermostat, the weighted or counterbalanced lever will sink at the weighted end with a resultant lifting of the damper to let in more heat until the normal temperature is restored in the heating chamber whereupon the thermostat will expand and return the parts to normal position. Upon the temperature rising to such a degree that complete closing of the damper takes place, the heat from the burner will be deflected back down the flue as above described, outside of the burner chimney so that the burner will not be extinguished or its operation interfered with in any manner.

For deflecting the heat laterally in the casing, I provide an arched baffle plate 44 the same being secured at one end to the casing and being provided with V-notches 45 in the opposite end through which the heat may escape. A cover plate 46 is disposed within the casing to house the thermostat as shown.

From the above description it will be seen that I have provided an extremely simple and inexpensive dough raiser that will be effective in operation, and may be formed of a few parts that will not easily get out of order.

What is claimed, is:—

A dough raiser including a casing, a heating chamber supported by said casing, a heating device below the casing adjacent one side thereof and communicating with said casing, and a baffle plate within the casing above its connection with the heating device and in spaced relation to the bottom of the casing, the end of said baffle plate adjacent the side of the casing remote from the heating device being turned down into engagement with the bottom of the casing and provided with V-notches forming heat escape openings.

In testimony whereof, I affix my signature, in the presence of two witnesses.

ELMER C. MEYER.

Witnesses:
C. W. WHITLOW,
W. C. LAUER.

Copies of this patent may be obtained for five cents each, by addressing the "Commissioner of Patents. Washington, D. C."